Figures 1, 2:
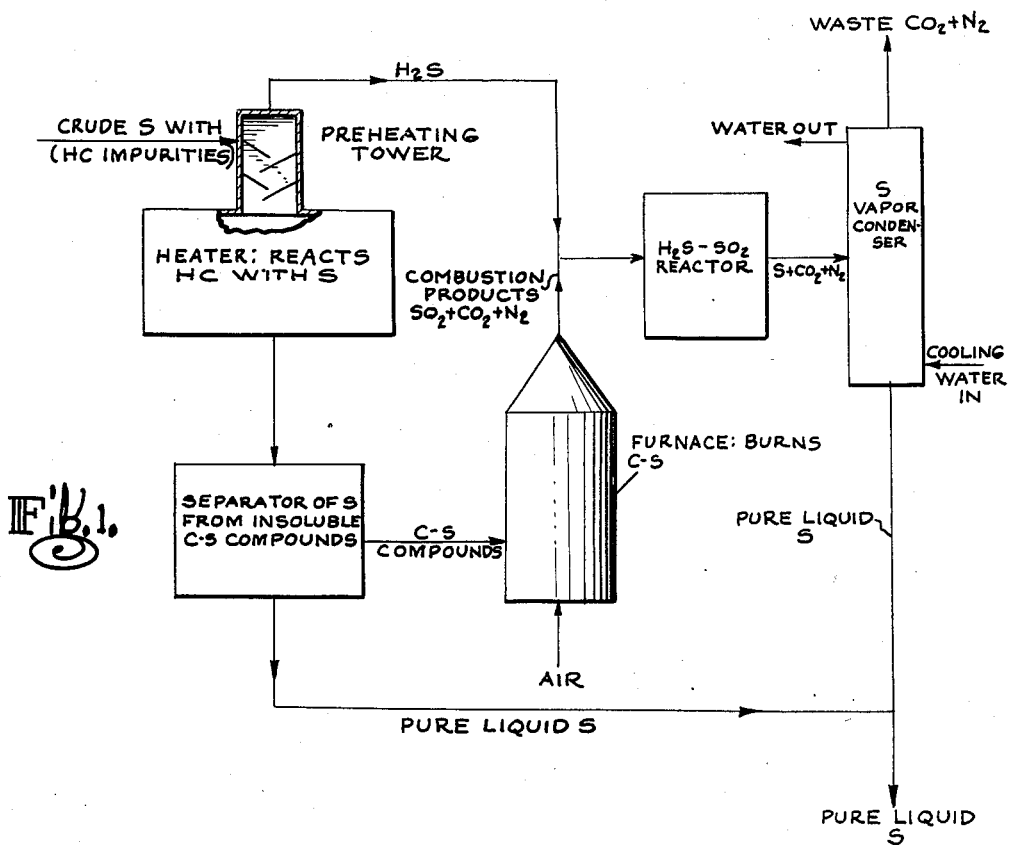

June 21, 1960   V. H. BROGDON, JR., ET AL   2,941,868
PURIFICATION OF CRUDE SULFUR
Filed March 28, 1957

INVENTORS
Vas Hubert Brogdon, Jr.
BY Edward W. Olsen
Pollard, Johnston, Smyth, Robertson
ATTORNEYS United States Patent Office 2,941,868
Patented June 21, 1960

2,941,868

PURIFICATION OF CRUDE SULFUR

Vas Hubert Brogdon, Jr., Port Sulphur, and Edward W. Olsen, Houma, La., assignors to Freeport Sulphur Company, New York, N.Y., a corporation of Delaware Filed Mar. 28, 1957, Ser. No. 649,048

11 Claims. (Cl. 23—224)

This invention relates to the purification of those sulfurs which contain objectionable impurities exemplified by certain crude or Frasch mined sulfurs usually dark in color, from brown to black. More particularly, it may be considered to relate to the production of high grade or substantially pure elemental sulfur from crude and other impure sulfurs containing undesirable amounts impurities.

Very little knowledge as to the constitution of the impurities in such dark or off-color sulfurs is recorded in the literature, these impurities being referred to generally as "carbonaceous" materials. In distillation residues obtained during conventional purification processes, the impurities have been referred to as "tarry" or "bituminous" compounds. It is now considered as a fact that the impurities initially present are hydrocarbons of various undetermined constitutions and that on heating to high temperatures, they react with sulfur forming $H_2S$ and other gaseous sulfur compounds and sulfur-insoluble complex carbon-sulfur compounds, which compounds will sometimes be hereinafter referred to as "carsul."

A number of methods of purifying crude sulfur have heretofore been proposed, but they invariably have either been ineffective in accomplishing adequate purification or they have been wasteful of elemental sulfur or uneconomical for other reasons. For example, crude sulfur distilled in a boiler leaves a viscous waste product composed of elemental sulfur and tarry substances (carsul), such sulfur being present in the waste product in at least a ten-fold quantity in relation to the tarry products, this minimum proportion of sulfur being necessary to provide the fluidity required for removal of the residue from the sulfur boiler. The residual elemental sulfur and the combined sulfur in this waste product has represented a substantial loss. Purification of the dark sulfur by means of filtration with adsorbent clays, has also been proposed, but these treatments following conventional procedures requiring large amounts of clay are only partially effective and furthermore, they are expensive to operate, sulfur being a low price chemical handled in large bulk quantities.

Objects of the present invention are (1) to purify the above described crude or impure sulfurs without any appreciable loss of sulfur either in the form of elemental sulfur or in the form of combined sulfur bound in the impurities originally present or formed during the heating or other purification steps and (2) to accomplish the purification at low cost, both as to the energy consumed and the materials required.

Broadly expressed, the invention may be considered to involve processes for producing or recovering elemental sulfur in pure, or substantial purified form, from crude or impure sulfur (usually containing 0.1 to 3% carbon) which include heating the impure sulfur at a temperature and for a period accomplishing the reaction of the hydrocarbon impurities present with a part of the sulfur so as to form hydrogen sulfide gas which separates out from the reaction mass and to form insoluble carbon-sulfur compounds or carsul which remains suspended in the liquefied sulfur mass, next separating the elemental sulfur from the carsul, preferably by distillation, then heating the carsul with or without burning to convert all, or nearly all, of the same into gaseous carbon-sulfur compounds as carbon bisulfide, carbon oxysulfide and/or sulfur dioxide, next mixing the hydrogen sulfide previously produced with any gaseous carbon-sulfur compounds formed and reacting the same, preferably in a Claus kiln, with sulfur dioxide formed by the combustion of at least part of the carbon-sulfur compounds formed, thereby converting the sulfur content of all, or substantially all, of such gases to elemental sulfur.

By the foregoing procedure accomplishing the recovery of both the sulfur separated from the carsul and that produced by the reaction of the sulfur-containing gases, all or practically all of the sulfur present in the crude sulfur is recovered in purified elemental form.

According to one embodiment of the invention hereinbefore broadly described, the carsul separated from the elemental sulfur is burned in a furnace, advantageously in an inclined rotary kiln, with the aid of air introduced into the discharge end thereof, thereby producing sulfur dioxide from the combined sulfur. This sulfur dioxide gas is then mixed with the hydrogen sulfide previously produced and is reacted to produce elemental sulfur as hereinbefore described.

In other important embodiments of the invention, the carsul separated from the elemental sulfur is first heated without burning, by means of combustion gases to a high temperature which converts most of or at least a major portion of the solid carsul (e.g., up to 80–90%) into gaseous carbon-sulfur compounds, principally into carbon bisulfide together with some carbon oxysulfide, the latter or sulfur dioxide being produced if any excess or free air is present in the combustion gases employed in heating the sulfur by direct contact. These gaseous carbon-sulfur compounds (or at least part of them) along with any gaseous sulfur compounds formed by reaction of sulfur or sulfur compounds with the hot flue gases are mixed with the hydrogen sulfide produced during the initial heat treatment and then the mixture is reacted with sulfur dioxide by any process yielding elemental sulfur. The sulfur dioxide may be derived wholly or in part by burning a minor portion of the carsul residue (e.g. 10–20%) left from the above mentioned heat treatment, or it may be obtained by burning part of the gaseous carbon-sulfur compounds resulting from such heat treatment or from the burning of elemental sulfur or from other sources. The sulfur dioxide, of course, may be obtained by combining these two procedures, it being desirable from an economic standpoint to correlate the amount of sulfur dioxide produced with the available amount of sulfur-containing gases ($H_2S$, $CS_2$ and COS) produced in the process. By operating in this manner, no difficulty is encountered with any excess of any of the sulfur-containing gases and the recovery of elemental sulfur from the crude sulfur is maintained at a maximum.

The purification processes encompassed by the present invention may be readily understood from the accompanying drawings where two exemplary procedures are diagrammatically illustrated.

In connection with Fig. 1, the crude dark Frasch-mined sulfur containing 0.2% to 1.5% carbon in the form of hydrocarbon impurities, is fed into a preheating tower wherein the sulfur cascades downwardly over trays and flows into a heater which serves primarily as a retention tank, the sulfur mass being heated in the tower to a temperature above 650° F. but below the boiling point (832° F. at atmospheric pressure) of the sulfur at the existing pressure. While the sulfur is in the retention tank-heater at a temperature preferably approaching 832° F., the hydrocarbon impurities in the crude sulfur react with the sulfur and form a series of compounds of carbon and sulfur in various proportions, and hydrogen sulfide is formed and released as a gas. This hydrogen sulfide gas and sulfur vaporized in the heater or supplied to the heater flow upwardly through the tower preheating the crude sulfur flowing downwardly therethrough. The sulfur vapor present, being condensed and liquefied, flows back into the heater.

When the required reaction between the hydrocarbons and the sulfur has been completed in the heater (e.g. in 15 to 20 minutes), the heater is blown down, either batchwise or continuously, and the boiler bottoms or blowdown composed of liquid sulfur and the carbon sulfur compounds or carsul is treated for separation of the sulfur from the carsul. This separation may be accomplished by any one of several procedures, as follows:

A. The elemental sulfur is vaporized from the bottoms in a kiln or other suitable type of furnace, the carsul being obtained in dry form.

B. The bottoms is subjected to filtration preferably with the assistance of a filter aid, such as clay, which retains the carsul and permits the liquid sulfur to pass therethrough.

C. The elemental sulfur is removed from the carsul by means of a selective solvent for the sulfur, such as carbon disulfide, the separation of the sulfur solution from the insoluble carsul being accomplished by filtration or centrifuging, and the dissolved sulfur being recovered from the solution, as by vaporizing off the solvent.

The carsul obtained by any of the preceding alternative processes is then treated to recover its bound sulfur content. With the aid of heat at high temperatures, the sulfur content is converted to gaseous sulfur compounds. In the embodiment illustrated in this Fig. 1 the carsul is flowed to a furnace where it is burned with the aid of air. This operation produces combustion products composed principally of sulfur dioxide, COS, carbon dioxide, nitrogen and possibly some $H_2S$. These combustion gases are then mixed with the hydrogen sulfide produced in the initial heating step hereinbefore described and the mixture is passed into a Claus kiln or other sulfur gas reactor wherein the sulfur-containing gases combine and form elemental sulfur and water vapor. The reaction between the hydrogen sulfide and the sulfur dioxide, alternatively, may be brought about by any one of the other known procedures for accomplishing this result, involving quite varied reaction conditions, high temperatures or low temperatures, in gaseous phase or in liquid phase, with or without the aid of a catalyst.

The sulfur vapors, carbon dioxide and nitrogen from the reactor are thereupon flowed through a sulfur vapor condenser from which the pure liquid sulfur obtained is flowed to a point of collection and combined with the sulfur separated from the carsul by any of the three procedures hereinbefore described.

A preferred and most important embodiment of the invention is illustrated in Fig. 2. With reference to this figure, a high-carbon content dark Frasch-mined sulfur containing 0.5% carbon is introduced into the preheating tower A where it cascades downwardly over trays in contact with hydrogen sulfide gases and sulfur vapor, the vapors being condensed in heating the crude sulfur to about 832° F.

The preheated crude sulfur flows from the tower A into an insulated horizontal drum or retention tank B through which the liquid sulfur flows from one end to the other. The liquid sulfur flow rate and the size of the tank B are correlated such that the liquid sulfur fills only the lower half of the drum, leaving the top half open for flow of sulfur vapors from the sulfur boiler C which in passing countercurrently through the upper half of this tank or drum comes in direct contact with the liquid layer as such vapor progresses to the preheating tower A. The direct contact may be facilitated by means of a screw conveyor in drum B (not shown), equipped with paddles, which is mechanically rotated at a slow rate. The screw conveyor insures progressive movement of the whole body of liquid through the drum and prevents recirculating currents that would reduce the effective capacity of the drum.

The flow of the sulfur is so regulated that the sulfur is maintained in the drum for a period of about 15 to 30 minutes, in order that the desired reaction will be completed. The hydrocarbons in the crude sulfur react with the sulfur during this retention period, producing (1) hydrogen sulfide and any other sulfur-containing gases which along with the sulfur vapors heats the downflowing sulfur as it flows up and through the preheater, and forming (2) various unidentified carbon-sulfur compounds or carsul, all or most all of which is insoluble in the liquid sulfur.

From the retention tank B, the liquid sulfur containing the carsul suspended therein flows to the sulfur boiler C wherein sulfur vapors are produced, the same being removed through the sulfur dome D. The blow-down or boiler bottoms from the boiler C is next passed through a scrubbing and vaporizing tower E. Thereupon, the liquid leaving the tower E is forced into a kiln or furnace F, the sulfur mass at this point containing not more than about five but preferably about three percent carsul (calculated as free carbon). The amount of sulfur vaporized from the sulfur in the boiler and removed and collected as a part of the sulfur product can be varied from a small amount or practically none up to 50% of the sulfur contained in the initial feed.

In both of these units E and F, the sulfur comes in contact with countercurrently flowing hot combustion gases produced in or introduced into the kiln which preferably is of rotary construction. These hot combustion gases vaporize off all or substantially all of the elemental sulfur contained in the bottoms, at a temperature somewhat below 832° F.

In a preferred operation treating a feed sulfur containing 0.5% carbon, about 1.5% of the sulfur feed is converted to hydrogen sulfide and about another 1.0% is converted to carsul. Of the remaining elemental sulfur, about 25% can be advantageously distilled from the boiler C, about 60% can be evaporated in the tower E and the remaining 15% can be recovered by distillation from the carsul in the kiln F.

In the preferred procedure, the carsul essentially freed of elemental sulfur is heated in the kiln to a temperature of about 2200° F. or higher by means of hot combustion gases produced partly by burning fuel gas with air in the kiln. The heat in the kiln results in the conversion of some of the carsul, up to about 90% thereof, to carbon disulfide, and, if any free oxygen is present, in the formation of some carbon oxysulfide or sulfur dioxide. The sulfur content of the residual carsul, reduced to about 10% of the quantity originally present in the carsul represents a very small amount of sulfur and may be discharged to waste. In this embodiment, however, all of the sulfur content is recovered from the carsul. Sufficient excess air is introduced into the discharge end of the kiln there to burn the carsul residue and convert its sulfur into sulfur dioxide. Alternatively, the residual carsul may be discharged from the kiln as a dry powder and burned separately, the combustion gases being fed back into the kiln F or the tower E.

The amount of the heat to be supplied from the fuel gas is reduced by the amount of heat supplied by the combustion of the residual carsul. If the residual carsul is burned in the kiln, a small amount of non-combustible ash will be produced and this ash can be easily removed from the lower end of the kiln.

The amount of fuel required in the process may be kept at a minimum to provide the most economical and satisfactory overall operation by adjusting the elemental sulfur content of the blow down fed into the scrubbing and vaporizing tower E so as to utilize to the fullest the heat of the combustion gases resulting from the burning of the carsul residue, and adjusting downwardly as far as possible the relative amounts of fuel burned under the sulfur boiler C and in the kiln F.

The vapor and gases leaving the kiln are composed of sulfur vapor and combustion products normally including sulfur dioxide, hydrogen sulfide, carbon bisulfide, some carbon oxysulfide, carbon dioxide, water and nitrogen. These vapors and combustion products flow upwardly through the packed or tray tower E wherein they may serve to vaporize sulfur from the bottoms flowing therethrough, and in turn are freed of dust. The combustion products and sulfur vapor then are flowed through a waste heat boiler G wherein steam at about 50 p.s.i. is produced for engines which operate driving pumps, electricity generators and other units of the plant being described. From this boiler G the sulfur vapor and combustion products flow through a packed or tray condenser-scrubbing tower H wherein the sulfur vapor is condensed by contact with cooled liquid sulfur. The gaseous combustion products, separating from the liquid sulfur, flow from the top of the tower H to a reheater I where the temperature is increased to about 500° F. by admixture with combustion gases produced in a conventional burner connected thereto. The gases leaving the reheater are then mixed with the hydrogen sulfide or other sulfur gases produced by the initial thermal reaction in tank B and the mixture is flowed to a Claus kiln J wherein the sulfur dioxide reacts in known manner with the hydrogen sulfide, the carbon bisulfide and the carbon oxy-sulfide in the presence of a catalyst thereby forming elemental sulfur, water vapor and carbon dioxide. These reaction products are then flowed into the condenser K wherein the sulfur vapors are condensed and from which they flow to the pure liquid sulfur product tank L. Sulfur vapors leaving the sulfur dome D of the boiler C, are flowed to the condenser M, the liquid sulfur produced therein being flowed to and collected also in this tank L. Liquid sulfur contained in the tank L is pumped through a cooler N to the condenser-scrubber tower H from which said sulfur together with the additional sulfur condensed therein are flowed to the tank L.

It should be understood that the instant invention is not limited to the specific procedures or conditions herein described but that it extends to all equivalents which will occur to those skilled in the art upon consideration of the scope of the claims appended hereto.

We claim:

1. Process for the production of substantially purified elemental sulfur from crude and other impure sulfurs containing hydrocarbon impurities which comprises, heating the impure sulfur to a temperature causing reaction of the hydrocarbons with sulfur thereby producing insoluble carbon-sulfur compounds which remain in the liquefied sulfur obtained and hydrogen sulfide gas which separates out, separating the elemental sulfur from the carbon-sulfur compounds in the sulfur liquid, heating and converting substantially all of the insoluble carbon-sulfur compounds into gaseous compounds of sulfur, by a procedure which includes burning at least part of the carbon-sulfur compounds with the addition of oxygen to form sulfur dioxide mixing together and reacting the $H_2S$ gas and any gaseous carbon-sulfur compounds formed, with sulfur dioxide formed by said combustion of at least a part of the carbon-sulfur compounds hereinbefore specified, thereby producing elemental sulfur which, when added to the sulfur already separated, constitutes substantially all of the sulfur content of the impure sulfur initially treated.

2. Process for the production of substantially purified elemental sulfur from crude and other impure sulfurs containing hydrocarbon impurities which comprises, heating the impure sulfur to a temperature causing reaction of the hydrocarbons with sulfur thereby producing insoluble carbon-sulfur compounds which remain in the liquefied sulfur obtained and hydrogen sulfide gas which separates out, separating the elemental sulfur from the carbon-sulfur compounds in the sulfur liquid, converting the sulfur content of the carbon-sulfur compounds to sulfur dioxide by burning the same with the addition of oxygen, mixing together and reacting said sulfur dioxide and hydrogen sulfide previously obtained, thereby producing elemental sulfur which, when added to the sulfur already separated, constitutes substantially all of the sulfur content of the impure sulfur initially treated.

3. Process for the production of substantially purified elemental sulfur from crude and other impure sulfurs containing hydrocarbon impurities which comprises, heating the impure sulfur to a temperature causing reaction of the hydrocarbons with sulfur thereby producing insoluble carbon-sulfur compounds which remain in the liquefied sulfur obtained and hydrogen sulfide gas which separates out, vaporizing off substantially all of the elemental sulfur from said liquefied sulfur mass, heating the remaining carbon-sulfur compounds to a temperature which produces gaseous carbon-sulfur compounds therefrom, burning a portion of the gaseous compounds produced with the addition of air to produce sulfur dioxide, mixing together and reacting said sulfur dioxide with the remaining portion of the gaseous compounds thereby producing elemental sulfur, collecting both said vaporized sulfur and said elemental sulfur.

4. The process of claim 3 wherein the portion of the gaseous compounds burned is that which provides sulfur dioxide in an equivalent amount which will react with the unburned remainder of the gaseous compounds in producing elemental sulfur.

5. Process for the production of substantially purified elemental sulfur from crude and other impure sulfurs containing hydrocarbon impurities which comprises, heating the impure sulfur to a temperature causing reaction of the hydrocarbons with sulfur thereby producing insoluble carbon-sulfur compounds which remain in the liquefied sulfur mass obtained and gaseous hydrogen sulfide which separates out, vaporizing off substantially all of the elemental sulfur from said liquefied sulfur mass, heating the residue of carbon-sulfur compounds by directly contacting the same with hot combustion gases to a temperature which produces gaseous carbon-sulfur compounds from a major portion thereof, burning a portion of the carbon-sulfur compounds produced with the addition of air to produce sulfur dioxide, mixing together and reacting said sulfur dioxide with said hydrogen sulfide and with gaseous carbon-sulfur compounds produced by said heating step, thereby producing elemental sulfur, collecting both said vaporized sulfur and said elemental sulfur.

6. Process for the production of substantially purified elemental sulfur from crude and other impure sulfurs containing hydrocarbon impurities which comprises, heating the impure sulfur to a temperature causing reaction of the hydrocarbons with sulfur thereby producing insoluble carbon-sulfur compounds which remain in the liquefied sulfur mass obtained and gaseous hydrogen sulfide which separates out, vaporizing off substantially all of the elemental sulfur from said liquefied sulfur mass, heating the residue of carbon-sulfur compounds by directly contacting the same with hot combustion gases to a temperature which produces gaseous carbon-sulfur compounds from a major portion thereof, burning the remaining minor portion of said residue of carbon-sulfur compounds with the addition of air to produce sulfur dioxide, mixing together and reacting said sulfur dioxide with said hydrogen sulfide and with gaseous carbon-sulfur compounds produced by said heating step, thereby producing elemental sulfur, collecting both said vaporized sulfur and said elemental sulfur.

7. Process for the production of substantially purified elemental sulfur from crude and other impure sulfurs containing hydrocarbon impurities which comprises, heating the impure sulfur at a temperature causing reaction of the hydrocarbons with sulfur by heat transfer from the hot sulfur vapor produced in the sulfur vaporization step to follow, continuing the heating until there are produced insoluble carbon-sulfur compounds which remain in the liquefied sulfur mass obtained and hydrogen sulfide gas which separates out, vaporizing off substantially all of the elemental sulfur from said liquefied sulfur mass, heating the residue of carbon-sulfur compounds by directly contacting the same with hot combustion gases to a temperature which produces gaseous carbon-sulfur compounds from a major portion thereof, burning a portion of the carbon-sulfur compounds produced with the addition of air to produce sulfur dioxide, mixing together and reacting said sulfur dioxide with said hydrogen sulfide and with gaseous carbon-sulfur compounds produced by said heating step, thereby producing elemental sulfur, collecting both said vaporizing sulfur and said elemental sulfur.

8. Process for the production of substantially purified elemental sulfur from crude and other impure sulfurs containing hydrocarbon impurities which comprises, heating said impure sulfur at a temperature causing reaction of the hydrocarbons with sulfur by direct heat transfer to a downwardly flowing stream thereof in a heating tower with a flowing stream of hot sulfur vapor, continuing the heating until there are produced insoluble carbon-sulfur compounds which remain in the liquefied sulfur mass obtained and hydrogen sulfide gas which separates out and flows upwardly through said tower, vaporizing off substantially all of the elemental sulfur from said liquefied sulfur mass, heating the residue of carbon-sulfur compounds by directly contacting the same with hot combustion gases to a temperature which produces gaseous carbon-sulfur compounds from a major portion thereof, burning a portion of the carbon-sulfur compounds produced with the addition of air to produce sulfur dioxide, mixing together and reacting said sulfur dioxide with said hydrogen sulfide and with gaseous carbon-sulfur compounds produced by said heating step, thereby producing elemental sulfur, collecting both said vaporized sulfur and said elemental sulfur.

9. Process for the production of substantially purified elemental sulfur from crude and other impure sulfurs containing hydrocarbon impurities which comprises, heating the impure sulfur to a temperature causing reaction of the hydrocarbons with sulfur thereby producing insoluble carbon-sulfur compounds which remain in the liquefied sulfur mass obtained and gaseous hydrogen sulfide which separates out, vaporizing off substantially all of the elemental sulfur from said liquefied sulfur mass, introducing the residue in dispersed form into a rotary kiln in direct contact with hot combustion gases flowing countercurrently therewith, heating said residue therein to a temperature producing carbon bisulfide from a major portion of the carbon-sulfur compounds thereof, converting the remaining carbon-sulfur compounds amounting to 10–20% of the quantity initially present into sulfur dioxide and carbon dioxide by burning the dry residue in air, mixing together and reacting said sulfur dioxide with said hydrogen sulfide and said carbon bisulfide, thereby producing elemental sulfur, collecting both said vaporized sulfur and said elemental sulfur.

10. The process defined in claim 1 wherein the separation of the elemental sulfur from the carbon sulfur compounds in the sulfur liquid is effected by filtration.

11. The process defined in claim 1 wherein the separation of the elemental sulfur from the carbon sulfur compounds in the sulfur liquid is effected by selectively dissolving the sulfur and separating the same from the carbon-sulfur compounds, the solvent used being thereafter separated from the solution to provide the sulfur in solid elemental form.

References Cited in the file of this patent
UNITED STATES PATENTS

| | | |
|---|---|---|
| 1,953,225 | Hechenbleikner | Apr. 3, 1934 |
| 2,169,261 | Lee et al. | Aug. 15, 1939 |
| 2,809,095 | Hills | Oct. 8, 1951 |
| 2,664,345 | Kohl et al. | Dec. 29, 1953 |
| 2,839,365 | Murray | June 17, 1958 |